United States Patent
Ray

(10) Patent No.: US 8,547,563 B2
(45) Date of Patent: Oct. 1, 2013

(54) MOBILE DEVICE SCAN FOR PRINTING DEVICES

(75) Inventor: Elton Tarik Ray, Livonia, NY (US)

(73) Assignee: Xerox Corporation, Norwalk, CT (US)

( * ) Notice: Subject to any disclaimer, the term of this patent is extended or adjusted under 35 U.S.C. 154(b) by 538 days.

(21) Appl. No.: 12/939,355

(22) Filed: Nov. 4, 2010

(65) Prior Publication Data

US 2012/0113449 A1    May 10, 2012

(51) Int. Cl.
- G06F 3/12 (2006.01)
- G06F 15/00 (2006.01)
- G06F 3/00 (2006.01)
- G06K 1/00 (2006.01)
- G06K 15/00 (2006.01)
- H04N 1/04 (2006.01)

(52) U.S. Cl.
USPC ......... 358/1.13; 358/1.14; 358/1.15; 358/1.9; 358/474; 715/745

(58) Field of Classification Search
None
See application file for complete search history.

(56) References Cited

U.S. PATENT DOCUMENTS

| | | | |
|---|---|---|---|
| 4,999,617 A | 3/1991 | Uemura et al. | |
| 5,051,839 A | 9/1991 | Nakahara et al. | |
| 5,510,896 A | 4/1996 | Wafler | |
| 5,790,279 A | 8/1998 | Sakellaropoulos | |
| 5,854,694 A | 12/1998 | Payne et al. | |
| 5,872,552 A | 2/1999 | Gordon, II et al. | |
| 6,032,004 A | 2/2000 | Mirabella, Jr. et al. | |
| 6,278,513 B1 | 8/2001 | Murata et al. | |
| 6,685,093 B2 | 2/2004 | Challa et al. | |
| 6,781,823 B1 | 8/2004 | Nyack | |
| 7,028,906 B2 | 4/2006 | Challa et al. | |
| 8,286,083 B2 * | 10/2012 | Barrus et al. | 715/745 |
| 2004/0017361 A1 | 1/2004 | Lieu | |
| 2008/0080010 A1 | 4/2008 | Korst | |
| 2008/0278437 A1 | 11/2008 | Barrus et al. | |
| 2010/0309503 A1 * | 12/2010 | Partridge et al. | 358/1.14 |
| 2010/0309504 A1 * | 12/2010 | Partridge et al. | 358/1.15 |
| 2010/0309505 A1 * | 12/2010 | Partridge et al. | 358/1.15 |
| 2012/0229843 A1 * | 9/2012 | Golle et al. | 358/1.15 |
| 2013/0021638 A1 * | 1/2013 | Hong et al. | 358/1.14 |
| 2013/0021643 A1 * | 1/2013 | Nuggehalli et al. | 358/1.15 |
| 2013/0083337 A1 * | 4/2013 | Tecu et al. | 358/1.13 |

* cited by examiner

*Primary Examiner* — Satwant Singh
(74) *Attorney, Agent, or Firm* — Gibb & Riley, LLC

(57) ABSTRACT

Methods and systems provide a user with an option, on a graphic user interface of a printing device, for scanning a self-illuminated display of a portable device (such as a cell phone, PDA, camera, etc.). In response to the user selecting the option for scanning a self-illuminated display of their portable device, the illumination source of the printing device is deactivated and the responsiveness of the light sensor of the printing device is increased. The process of increasing of the responsiveness of the light sensor changes the responsiveness to an increased level above a base level that is used when the illumination source is active. Then, while the illumination source is deactivated and while the responsiveness of the light sensor is at the increased level, the light sensor is used to scan the self-illuminated display of the portable device to acquire an image displayed on the self-illuminated display of the portable device.

20 Claims, 3 Drawing Sheets

MOBILE DEVICE SCAN FOR PRINTING DEVICES

BACKGROUND

Embodiments herein generally relate to printing devices and more particularly to methods and printing devices that disable the scanner illumination and increase sensitivity of sensors when scanning display screens of mobile devices.

Portable devices such as cell phones, cameras, personal digital assistants (PDAs) and other computerized devices are becoming more and more popular. Further, the screen displays of such devices continue to grow in size, clarity, and brightness. However, because of the size and limited battery capacity of such portable devices, they often can suffer from disadvantages such as limited Internet access and a limited ability to communicate with printing devices.

For example, because of the limited memory capabilities of portable computing devices, such devices do not maintain extensive amounts of software to allow them to easily connect to the multitude of different printing devices that currently exist. This makes it difficult for the portable computing devices to connect to and print using a printer that the portable computing device has not been specifically paired to. Instead, users often need to send a document or image (by e-mail, text messaging, or instant messaging) to a computer that is locally connected to a printer in order to print a document or image that may be stored on the portable computing device. The use of such intermediary devices is awkward, time-consuming, and frustrating for the user. The embodiments described below address such issues and help coordinate the use of portable computerized devices and printing devices.

SUMMARY

One exemplary method embodiment herein begins by providing a user with an option, on a graphic user interface of a printing device, for scanning a self-illuminated display of a portable device (such as a cell phone, PDA, camera, etc.). In response to the user selecting the option for scanning a self-illuminated display of their portable device, the method embodiments herein control the processor of the printing device to deactivate the illumination source of the scanner device and increase the responsiveness of the light sensor of the printing device. The process of increasing the responsiveness of the light sensor changes the responsiveness to an increased level above a base level that is used when the illumination source is active.

Then, while the illumination source is deactivated and while the responsiveness of the light sensor is at the increased level, the methods herein use the light sensor to scan the self-illuminated display of the portable device to acquire an image displayed on the self-illuminated display of the portable device. Further, some embodiments can transmit the scanned image to a separate computerized device connected to a communications port of the printing device over a computerized network (also connected to the communications port). In other embodiments, the method can enhance, store, and process the image captured from the self-illuminated display of the portable device.

A printing device embodiment herein comprises a processor, and a communications port operatively connected to the processor and to a computerized network. Further, a graphic user interface is operatively connected to the processor, and the graphic user interface provides the user an option for scanning a self-illuminated display of a portable device.

Additionally, a transparent scanning surface is on an exterior of the printing device. An illumination source is adjacent the transparent scanning surface, and the illumination source is operatively connected to the processor. The illumination source provides light to objects placed on the transparent scanning surface. Also, a light sensor is adjacent the transparent scanning surface, and the light sensor is operatively connected to the processor. The light sensor detects light reflected from objects placed on the transparent scanning surface.

The processor deactivates the illumination source and increases the responsiveness of the light sensor in response to the user selecting the option for scanning the self-illuminated display of a portable device. The process of increasing the responsiveness of the light sensor changes the responsiveness to an increased level above a base level used when the illumination source is active. The process of increasing the responsiveness of the light sensor compensates for a difference between a first brightness of the self-illuminated display of the portable device and a second brightness of light from the illumination source reflected off objects placed on the transparent scanning surface.

The light sensor scans the self-illuminated display of the portable device while the illumination source is deactivated and while the responsiveness of the light sensor is at the increased level to acquire an image displayed on the self-illuminated display of the portable device. In some embodiments, the communications port can transmit the image to a separate computerized device connected to the communications port over the computerized network. Further, the processor can enhance, store, and process the image captured from the self-illuminated display of the portable device.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, screen displays of portable computerized devices continue to grow in size, clarity, and brightness; however, such devices often can suffer from disadvantages such as limited Internet access and a limited ability to communicate with printing devices. In order to address such issues, the embodiments herein utilize the increasingly ubiquitous ability for mobile devices to display documents, images, data, etc., on their screens as a mechanism for printing/scanning/faxing directly from a mobile device.

The embodiments herein change the settings on the scanner of the printing device in order to more clearly obtain the document or image displayed on the portable device's display. Once the printing device captures the image from the portable device's display, the printing device can then perform any requested operation(s) as if it were a standard print job. Therefore, for example, the image can be rotated, enlarged, cropped, enhanced etc. Further, any words or numbers can be processed through recognition programs, such as optical character recognition (OCR), to be converted into data. Further, if the printing device is connected to a network, the image or data from the portable device can easily be sent over the network (even if the portable device itself cannot connect with the network).

Figure 1:
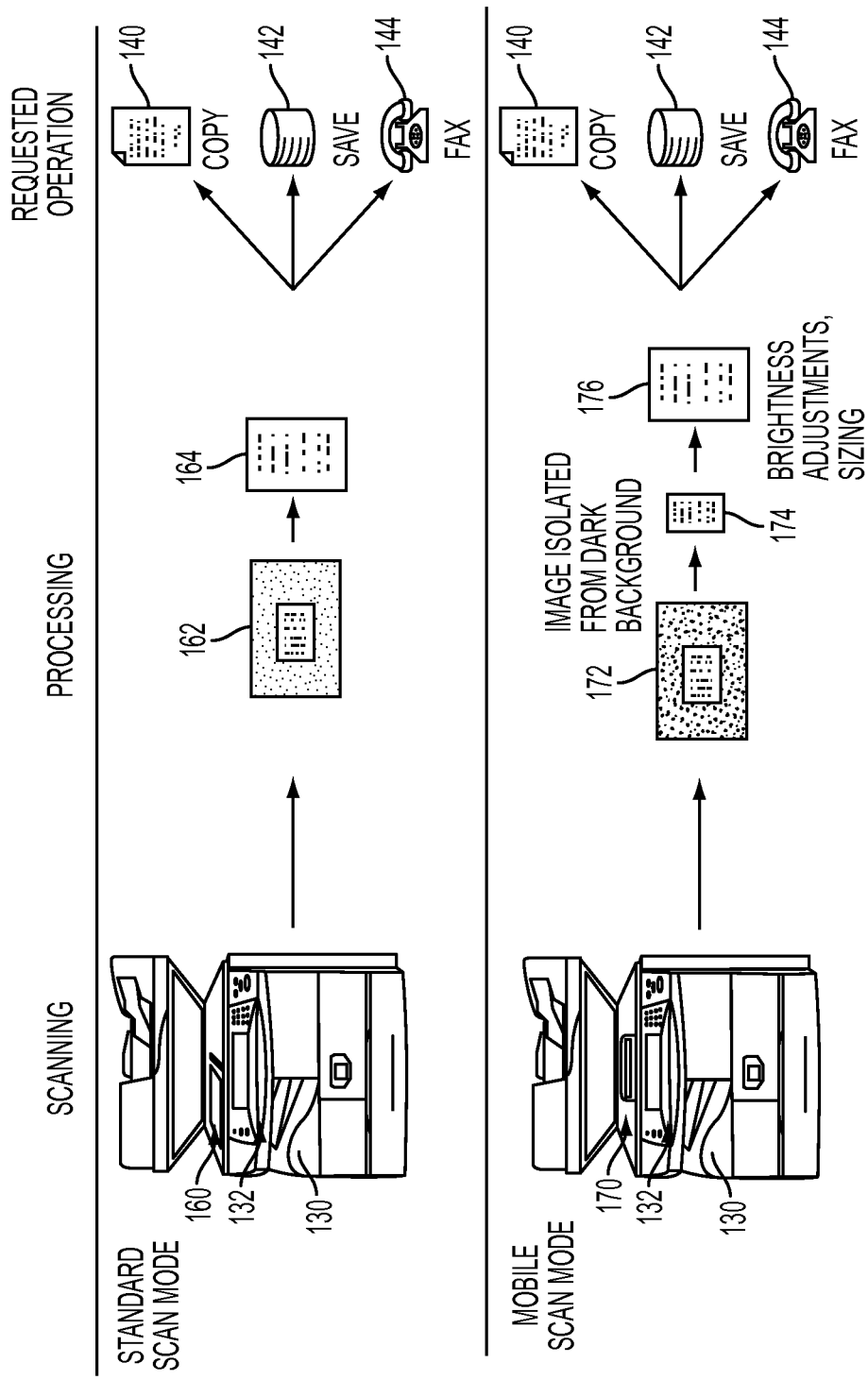
FIG. 1 is a schematic block diagram illustrating various embodiments herein.

For example, as shown in FIG. 1, when operating in the standard mode, a printing device 130 scans the document 160 by projecting light through a transparent scanning surface (platen) 132 and detecting the light reflected off the document 160 using light-sensitive sensors. The image of the document 162 can then be rotated and enlarged (item 164). Then, this rotated and enlarged image 164 can be copied 140, saved on a non-volatile computer readable storage medium 142, faxed 144, etc.

As also illustrated in FIG. 1, the embodiments herein can capture an image from any portable device 170 that includes a self-illuminated display screen. One issue with such self-illuminated display screens of portable devices is the relative difference in brightness between the illumination source below the platen 132 and the brightness of the portable device's display screen. In order to address this issue, with embodiments herein, when in mobile device scan mode, the light bar on the scanner is turned off so that the only illumination comes from the mobile device. Further, the image processing software is adjusted to normalize images that might otherwise appear dim or gray. Also, with embodiments herein, artifacts such as big dark areas are processed out of the resulting scanned image.

Thus, as shown in FIG. 1, once the printer is in the mobile device scan mode, a user can place their mobile device 170 screen face down on the platen 132 and press copy/scan/fax. The image 172 is scanned into the printer's memory and is manipulated to adjust brightness, and to remove areas of black that will appear over the entire scan area surrounding the device screen 174. Next any desired function can be performed on the image, such as enlargement, rotation, enhancement, etc. 176. Once again, this rotated and enlarged image 176 can be copied 140, saved on a non-volatile computer readable storage medium 142, faxed 144, etc.

Once the user is finished scanning the screen display of the portable device, the user can place the printer back in its standard mode, or after a timer elapses, the printer can go back to the standard mode automatically.

The embodiments herein eliminate security concerns because, when simply printing the image from the portable device's display screen, the user is not sending the document out over an unknown network. Further, what is copied, scanned, etc., is done so in "what you see is what you get" format that is not dependent on the type of connection between the mobile device and the printer, or a conflict between the mobile print software's PDL rendering and the candidate printer's rendering.

Additionally, the embodiments herein work in places where wireless connections may not, and for mobile devices that do not otherwise have wired or wireless connections that can communicate with the printing device. Also, the embodiments herein allow for an unlimited variety of document formats, because whatever the mobile device displays can be scanned using the printing device's scanner. The embodiments herein utilize recent advancements in mobile display technology, both in screen size and resolution, which allows one to display documents in a form that can be scanned with reasonable fidelity by a device that includes a scanner.

Figure 2:
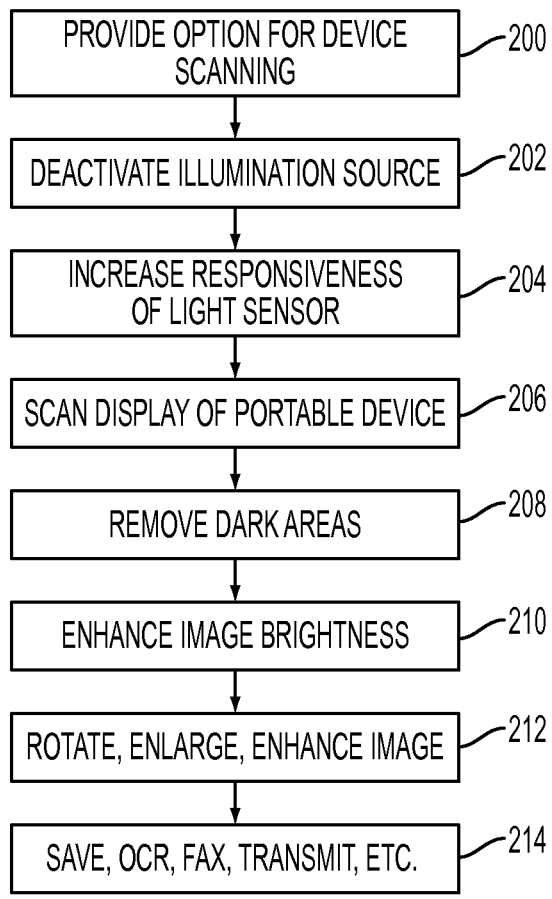
FIG. 2 is a schematic block diagram illustrating various embodiments herein.

FIG. 2 illustrates one exemplary method embodiment herein that begins by, in item 200, providing the user with an option, on the graphic user interface of the printing device, for scanning a self-illuminated display of a portable device (such as a cell phone, PDA, camera, etc.). In response to the user selecting the option for scanning a self-illuminated display of their portable device, the method embodiments herein control the processor of the printing device to deactivate the illumination source of the printing device (item 202) and increase the responsiveness of the light sensor of the printing device (item 204). The process of increasing of the responsiveness of the light sensor in item 204 changes the responsiveness to an increased level above a base level that is used when the illumination source is active and can comprise an actual adjustment of the sensor itself, or an adjustment of the software used to process the signals from the sensor.

Then, while the illumination source is deactivated and while the responsiveness of the light sensor is at the increased level, the methods herein use the light sensor to scan the self-illuminated display of the portable device to acquire an image displayed on the self-illuminated display of the portable device (item 206). In item 208, the embodiments herein remove any dark areas that may have been scanned. The dark areas are any areas outside the self-illuminated display screen of the portable computing device where, for example, the platen may have been uncovered or where the case or keyboard of the portable computing device is located.

Additionally, in item 210, the embodiments herein can enhance the image to increase its brightness and/or contrast. For example, the relatively lighter colored pixels can be increased in brightness and the relatively darker colored pixels can be made darker. Similarly, weak colors can be made brighter or stronger in order to enhance the appearance of the image scanned from the self-illuminated display of the portable device. Additionally, the image can be rotated, enlarged, or otherwise enhanced as shown in item 212.

Further, as shown in item 214, some embodiments herein can transmit the scanned image to a separate computerized device connected to a communications port of the printing device over a computerized network (also connected to the communications port). In other embodiments, in item 214 the method can enhance, store, and process the image captured from the self-illuminated display of the portable device.

Figure 3:
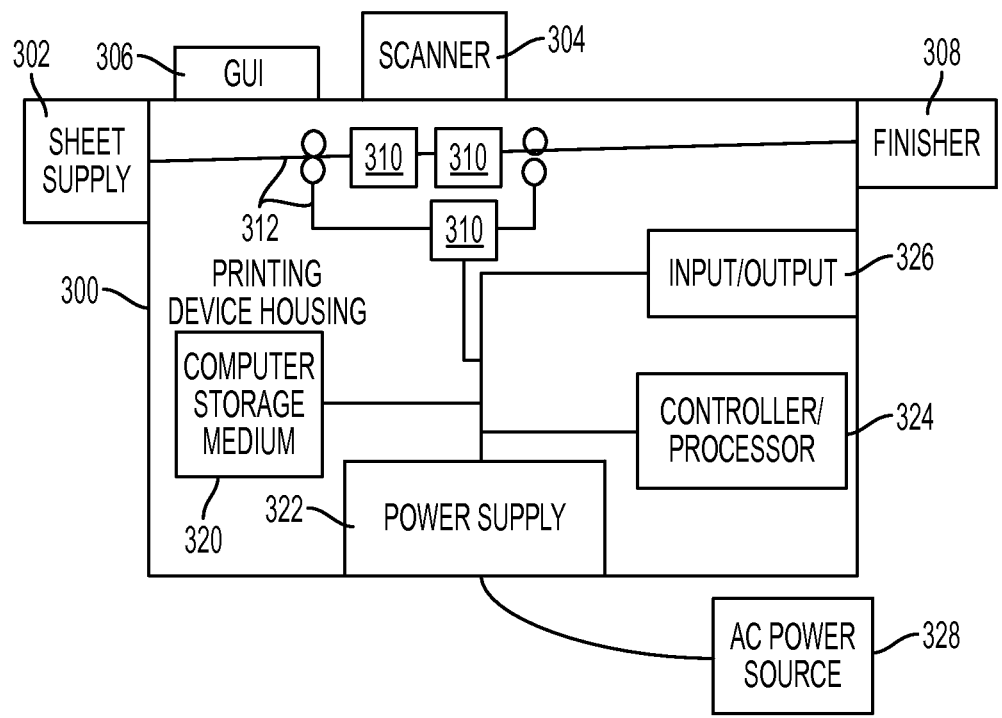
FIG. 3 is a schematic block diagram of a printing device according to embodiments herein.

FIG. 3 illustrates a printing device embodiment herein, which can comprise, for example, a printer, copier, multi-function machine, etc. The printer body housing 300 has one or more functional components that operate on power supplied from the alternating current (AC) 328 by the power supply 322. The power supply 322 converts the external power 328 into the type of power needed by the various components.

The printing device 300 includes a controller/processor 324, at least one marking device (printing engine) 310 operatively connected to the processor 324, a media path 312 positioned to supply sheets of media from a sheet supply 302 to the marking device(s) 310 and a communications port (input/output) 326 operatively connected to the processor 324 and to a computerized network external to the printing device. After receiving various markings from the printing engine(s), the sheets of media pass to a finisher 308 which can fold, staple, sort, etc., the various printed sheets.

Further, the printing device 300 includes at least one accessory functional component (such as a scanner/document handler 304, sheet supply 302, finisher 308, etc.) and graphic user interface assembly 306 that also operate on the power supplied from the external power source 328 (through the power supply 322).

The processor 324 controls the various actions of the printing device. A non-volatile computer storage medium 320 (which can be optical, magnetic, capacitor based, etc.) is readable by the processor 324 and stores the scanned images and instructions that the processor 324 executes to allow the multi-function printing device to perform its various functions, such as those described herein.

The graphic user interface 306 provides a user an option for scanning a self-illuminated display of a portable device. As would be understood by those ordinarily skilled in the art, the option can comprise a hard button (a physical button) or can comprise a menu selection (such as a soft button or pull down menu selection) appearing on the screen of the graphic user interface 306. Similarly, if the graphic user interface 306 comprises a touch screen display, the option for scanning a self-illuminated display of a portable device can comprise a soft button or other menu selection on the touch screen.

Figure 4:
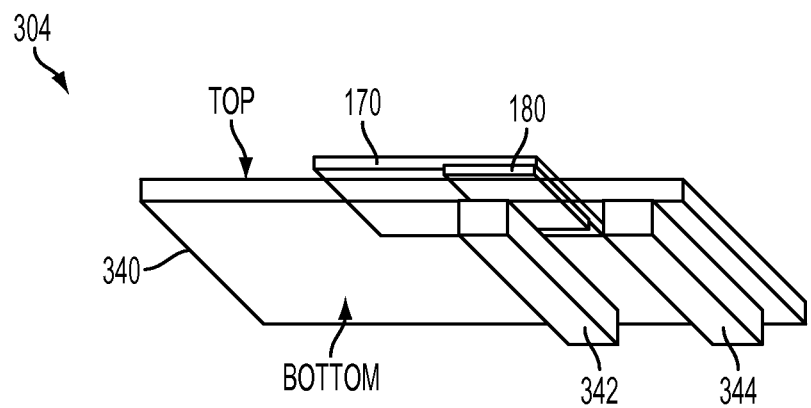
FIG. 4 is a schematic block diagram illustrating various embodiments herein.

FIG. 4 illustrates the portion of the scanner 304 that includes a transparent scanning surface 340 (such as a platen) that is positioned on the exterior of the printing device 300 and is easily accessible to the user. In FIG. 4, the transparent scanning surface 340 is shown from the bottom (a view from an internal portion of the printing device 300) in order to illustrate the illumination source 344 and the light sensor 342 that are located internally within the printing device 300.

As shown in FIG. 4, the illumination source 344 is adjacent the transparent scanning surface 340. The illumination source 344 is operatively connected to the processor 324. The illumination source 344 provides light to objects placed on the transparent scanning surface 340. The light sensor 342 is also adjacent the transparent scanning surface 340, and the light sensor 342 is also operatively connected to the processor 324. The light sensor 342 detects light reflected from objects placed on the transparent scanning surface 340.

The processor 324 deactivates the illumination source 344 and increases the responsiveness of the light sensor 342 (as discussed above) in response to the user selecting the option for scanning a self-illuminated display 180 of a portable device 170. When the illumination source 344 is activated it broadcasts light, and when it is deactivated it does not broadcast light. Again, the process of increasing the responsiveness of the light sensor 342 changes the responsiveness to an increased level above a base level used when the illumination source 344 is active. The process of increasing the responsiveness of the light sensor 342 compensates for the difference between a first brightness of the self-illuminated display 180 of the portable device 170 and a second potentially higher brightness of light from the illumination source 344 reflected off objects placed on the transparent scanning surface 340. In other words, because the brightness of the self-illuminated display 180 of the portable device 170 may be less than the brightness of the illumination source 344, the sensitivity of the light sensor 342 is (directly or indirectly) increased to compensate for this brightness difference.

The light sensor 342 scans the self-illuminated display 180 of the portable device 170 while the illumination source 344 is deactivated and while the responsiveness of the light sensor 342 is at the increased level to acquire an image displayed on the self-illuminated display 180 of the portable device 170. In some embodiments, the communications port 326 can transmit the image to a separate computerized device connected to the communications port 326 over the computerized network. Further, the processor 324 can enhance, store, and process the image captured from the self-illuminated display 180 of the portable device 170, as discussed above.

Therefore, as mentioned above, the embodiments herein eliminate security concerns because, when simply printing the image from the portable device's display screen, the user is not sending the document out over an unknown network. Further, what is copied, scanned, etc., is done so in "what you see is what you get" format that is not dependent on the type of connection between the mobile device and the printer, or a conflict between the mobile print software's PDL rendering candidate printer's rendering. Additionally, the embodiments herein work in places where wireless connections may not, and for mobile devices that do not otherwise have wired or wireless connections that can communicate with the printing device. Also, the embodiments herein allow for an unlimited variety of document formats, because whatever the mobile device displays can be scanned using the printing device's scanner. The embodiments herein utilize recent advancements in mobile display technology, both in screen size and resolution, which allows one to display documents in a form that can be scanned with reasonable fidelity by a device that includes a scanner.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A printing device comprising:
   a processor;
   a graphic user interface operatively connected to said processor, said graphic user interface providing a user an option for scanning a self-illuminated display of a portable device;
   a transparent scanning surface positioned on an exterior of said printing device;

an illumination source adjacent said transparent scanning surface, said illumination source being operatively connected to said processor; and a light sensor adjacent said transparent scanning surface, said light sensor being operatively connected to said processor, said processor deactivating said illumination source and increasing a responsiveness of said light sensor in response to said user selecting said option for scanning a self-illuminated display of a portable device, said increasing of said responsiveness of said light sensor comprising changing said responsiveness to an increased level above a base level used when said illumination source is active, and said light sensor scanning said self-illuminated display of said portable device while said illumination source is deactivated and while said responsiveness of said light sensor is at said increased level to acquire an image displayed on said self-illuminated display of said portable device.

2. The printing device according to claim 1, said illumination source providing light to objects placed on said transparent scanning surface.

3. The printing device according to claim 1, said light sensor detecting light from objects placed on said transparent scanning surface.

4. The printing device according to claim 1, said increasing of said responsiveness of said light sensor compensating for a difference between a first brightness of said self-illuminated display of said portable device and a second brightness of light from said illumination source reflected off objects placed on said transparent scanning surface.

5. The printing device according to claim 1, said processor enhancing, storing, and processing said image captured from said self-illuminated display of said portable device.

6. A printing device comprising:
    a processor;
    a communications port operatively connected to said processor and to a computerized network;
    a graphic user interface operatively connected to said processor, said graphic user interface providing a user an option for scanning a self-illuminated display of a portable device;
    a transparent scanning surface positioned on an exterior of said printing device;
    an illumination source adjacent said transparent scanning surface, said illumination source being operatively connected to said processor; and
    a light sensor adjacent said transparent scanning surface, said light sensor being operatively connected to said processor,
    said processor deactivating said illumination source and increasing a responsiveness of said light sensor in response to said user selecting said option for scanning a self-illuminated display of a portable device,
    said increasing of said responsiveness of said light sensor comprising changing said responsiveness to an increased level above a base level used when said illumination source is active,
    said light sensor scanning said self-illuminated display of said portable device while said illumination source is deactivated and while said responsiveness of said light sensor is at said increased level to acquire an image displayed on said self-illuminated display of said portable device, and
    said communications port transmitting said image to a separate computerized device connected to said communications port over said computerized network.

7. The printing device according to claim 6, said illumination source providing light to objects placed on said transparent scanning surface.

8. The printing device according to claim 6, said light sensor detecting light from objects placed on said transparent scanning surface.

9. The printing device according to claim 6, said increasing of said responsiveness of said light sensor compensating for a difference between a first brightness of said self-illuminated display of said portable device and a second brightness of light from said illumination source reflected off objects placed on said transparent scanning surface.

10. The printing device according to claim 6, said processor enhancing, storing, and processing said image captured from said self-illuminated display of said portable device.

11. A method comprising:
    providing a user an option, using a graphic user interface of a printing device, for scanning a self-illuminated display of a portable device;
    deactivating an illumination source of said printing device and increasing a responsiveness of a light sensor of said printing device, using a processor of said printing device, in response to said user selecting said option for scanning a self-illuminated display of a portable device, said increasing of said responsiveness of said light sensor comprising changing said responsiveness to an increased level above a base level used when said illumination source is active; and
    scanning, using said light sensor, said self-illuminated display of said portable device while said illumination source is deactivated and while said responsiveness of said light sensor is at said increased level to acquire an image displayed on said self-illuminated display of said portable device.

12. The method according to claim 11, said illumination source providing light to objects placed on a transparent scanning surface of said printing device.

13. The method according to claim 11, said light sensor detecting light from objects placed on a transparent scanning surface of said printing device.

14. The method according to claim 11, said increasing of said responsiveness of said light sensor compensating for a difference between a first brightness of said self-illuminated display of said portable device and a second brightness of light from said illumination source reflected off objects placed on a transparent scanning surface of said printing device.

15. The method according to claim 11, said processor enhancing, storing, and processing said image captured from said self-illuminated display of said portable device.

16. A method comprising:
    providing a user an option, using a graphic user interface of a printing device, for scanning a self-illuminated display of a portable device;
    deactivating an illumination source of said printing device and increasing a responsiveness of a light sensor of said printing device, using a processor of said printing device, in response to said user selecting said option for scanning a self-illuminated display of a portable device, said increasing of said responsiveness of said light sensor comprising changing said responsiveness to an increased level above a base level used when said illumination source is active;

scanning, using said light sensor, said self-illuminated display of said portable device while said illumination source is deactivated and while said responsiveness of said light sensor is at said increased level to acquire an image displayed on said self-illuminated display of said portable device; and transmitting said image to a separate computerized device connected to a communications port of said printing device over a computerized network connected to said communications port.

17. The method according to claim 16, said illumination source providing light to objects placed on a transparent scanning surface of said printing device.

18. The method according to claim 16, said light sensor detecting light from objects placed on a transparent scanning surface of said printing device.

19. The method according to claim 16, said increasing of said responsiveness of said light sensor compensating for a difference between a first brightness of said self-illuminated display of said portable device and a second brightness of light from said illumination source reflected off objects placed on a transparent scanning surface of said printing device.

20. The method according to claim 16, said processor enhancing, storing, and processing said image captured from said self-illuminated display of said portable device.

* * * * *